(12) United States Patent
Legler (10) Patent No.: US 11,061,876 B2
(45) Date of Patent: Jul. 13, 2021

(54) FAST AGGREGATION ON COMPRESSED DATA

(71) Applicant: SAP SE, Walldorf (DE)

(72) Inventor: Thomas Legler, Walldorf (DE)

(73) Assignee: SAP SE, Walldorf (DE)

( * ) Notice: Subject to any disclaimer, the term of this patent is extended or adjusted under 35 U.S.C. 154(b) by 1063 days.

(21) Appl. No.: 15/351,547

(22) Filed: Nov. 15, 2016

(65) Prior Publication Data

US 2018/0137173 A1 May 17, 2018

(51) Int. Cl.
*G06F 16/22* (2019.01)
*G06F 16/2455* (2019.01)

(52) U.S. Cl.
CPC ...... *G06F 16/221* (2019.01); *G06F 16/24556* (2019.01)

(58) Field of Classification Search
CPC .......................... G06F 16/221; G06F 16/24556
USPC .......................................................... 707/713
See application file for complete search history.

(56) References Cited

U.S. PATENT DOCUMENTS

| | | | | |
|---|---|---|---|---|
| 4,499,553 A * | 2/1985 | Dickinson | ......... | G06F 16/90344 715/257 |
| 5,742,806 A * | 4/1998 | Reiner | ............ | G06F 16/24532 |
| 6,370,524 B1 * | 4/2002 | Witkowski | ........ | G06F 16/24535 |
| 6,626,959 B1 * | 9/2003 | Moise | ............ | G06F 40/18 715/210 |
| 6,711,563 B1 * | 3/2004 | Koskas | ............ | G06F 16/284 707/769 |
| 6,768,994 B1 * | 7/2004 | Howard | ............ | G06F 16/9537 |
| 7,742,972 B2 * | 6/2010 | Lange | ............ | G07F 7/10 705/37 |
| 7,996,296 B2 * | 8/2011 | Lange | ............ | G07F 17/3288 705/37 |
| 8,032,391 B2 * | 10/2011 | Erie | ............ | B65B 5/00 705/1.1 |
| 8,126,794 B2 * | 2/2012 | Lange | ............ | G06Q 30/08 705/36 R |
| 8,577,778 B2 * | 11/2013 | Lange | ............ | H01L 21/28061 705/37 |

(Continued)

*Primary Examiner* — Mark E Hershley (74) *Attorney, Agent, or Firm* — Sterne, Kessler, Goldstein & Fox P.L.L.C.

(57) ABSTRACT

Disclosed herein are system, method, and computer program product embodiments for generating a data structure and responding to an aggregation query. An embodiment operates by a computer implemented method that includes receiving, by at least one processor, a request to enter data in a block in a data structure. The method further includes reading, by the at least one processor, a first aggregated value stored in the data structure. The first aggregated value represents a sum over at least values associated with data that is stored in the block in the data structure. The method further includes calculating, by the at least one processor, a second aggregated value by adding the first aggregated value and a value associated with the data to be entered in the data structure. The method further includes storing, by the at least one processor, at least part of the data to be entered and the second aggregated value in the block in the data structure. After the storing, the second aggregated value represents the sum over the at least values associated with the data that is stored in the block in the data structure.

15 Claims, 8 Drawing Sheets

(56) References Cited

U.S. PATENT DOCUMENTS

| | | | | |
|---|---|---|---|---|
| 9,792,341 B2* | 10/2017 | Chang | | G06F 16/22 |
| 2004/0122845 A1* | 6/2004 | Lohman | | G06F 16/278 |
| 2005/0015379 A1* | 1/2005 | Aureglia | | G06F 40/18 |
| 2005/0172092 A1* | 8/2005 | Lam | | G06F 11/1451 |
| | | | | 711/161 |
| 2006/0265342 A1* | 11/2006 | Froyland | | G06Q 99/00 |
| | | | | 705/500 |
| 2007/0016582 A1* | 1/2007 | Kawamura | | G06F 16/22 |
| 2008/0031277 A1* | 2/2008 | Walter | | H04L 41/12 |
| | | | | 370/469 |
| 2008/0103701 A1* | 5/2008 | Xiao | | G06N 3/126 |
| | | | | 702/20 |
| 2008/0103995 A1* | 5/2008 | Mohamed | | G06N 3/126 |
| | | | | 706/4 |
| 2008/0120129 A1* | 5/2008 | Seubert | | G06Q 10/10 |
| | | | | 705/35 |
| 2009/0018996 A1* | 1/2009 | Hunt | | G06F 16/2264 |
| 2010/0083147 A1* | 4/2010 | Gaffney | | G06F 16/24556 |
| | | | | 715/762 |
| 2011/0264663 A1* | 10/2011 | Verkasalo | | G06Q 10/0637 |
| | | | | 707/740 |
| 2011/0288877 A1* | 11/2011 | Ofek | | G06Q 10/10 |
| | | | | 705/2 |
| 2012/0116847 A1* | 5/2012 | Martorella | | G06Q 30/06 |
| | | | | 705/7.36 |
| 2012/0215560 A1* | 8/2012 | Ofek | | G16H 10/00 |
| | | | | 705/3 |
| 2013/0145296 A1* | 6/2013 | Stecher | | G06F 3/0482 |
| | | | | 715/765 |
| 2013/0159832 A1* | 6/2013 | Ingargiola | | G06Q 40/00 |
| | | | | 715/220 |
| 2014/0052726 A1* | 2/2014 | Amberg | | G06F 16/244 |
| | | | | 707/737 |
| 2014/0074805 A1* | 3/2014 | Kapoor | | G06F 16/902 |
| | | | | 707/693 |
| 2014/0372374 A1* | 12/2014 | Bourbonnais | | G06F 16/27 |
| | | | | 707/613 |
| 2015/0039626 A1* | 2/2015 | Sen | | G06F 16/24556 |
| | | | | 707/747 |
| 2015/0039627 A1* | 2/2015 | Sen | | G06F 16/2255 |
| | | | | 707/747 |
| 2015/0066861 A1* | 3/2015 | Ritto | | G06F 16/21 |
| | | | | 707/661 |
| 2015/0142775 A1* | 5/2015 | Kang | | G06F 16/24544 |
| | | | | 707/714 |
| 2015/0347549 A1* | 12/2015 | Chang | | G06F 16/27 |
| | | | | 707/610 |
| 2015/0378925 A1* | 12/2015 | Misra | | G06F 12/0815 |
| | | | | 711/141 |
| 2016/0007038 A1* | 1/2016 | Chou | | H04N 19/40 |
| | | | | 375/240.03 |
| 2016/0077989 A1* | 3/2016 | Pulyala | | G06F 13/4022 |
| | | | | 710/308 |
| 2016/0275150 A1* | 9/2016 | Bournonnais | | G06F 16/24575 |
| 2017/0019487 A1* | 1/2017 | Maheshwari | | H04L 41/22 |
| 2017/0046374 A1* | 2/2017 | Fletcher | | G06F 3/0482 |
| 2017/0061286 A1* | 3/2017 | Kumar | | G06Q 30/0269 |
| 2017/0262484 A1* | 9/2017 | Wong | | G06F 16/24 |
| 2017/0308572 A1* | 10/2017 | Finlay | | G06F 16/2453 |

* cited by examiner

| Position | Country | material | user | units | units summed up (aggregated Units) |
|---|---|---|---|---|---|
| 0 | | | | | 0 |
| 1 | Germany | wood | michael | 381 | 381 |
| 2 | Germany | wood | michael | 671 | 1052 |
| 3 | Germany | wood | michael | 819 | 1871 |
| 4 | Germany | wood | michael | 268 | 2139 |
| 5 | Germany | wood | michael | 971 | 3110 |
| 6 | Germany | wood | michael | 568 | 3678 |
| 7 | Germany | wood | mike | 744 | 4422 |
| 8 | Germany | wood | mike | 76 | 4498 |
| 9 | Germany | wood | james | 565 | 5063 |
| 10 | Germany | iron | michael | 329 | 5392 |
| 11 | Germany | iron | mike | 717 | 6109 |
| 12 | Germany | iron | james | 567 | 6676 |
| 13 | Germany | plastic | armin | 769 | 7445 |
| 14 | France | wood | ann | 975 | 8420 |
| 15 | France | wood | michael | 96 | 8516 |
| 16 | France | wood | james | 668 | 9184 |
| 17 | France | wood | mike | 243 | 9427 |
| 18 | France | iron | mike | 345 | 9772 |
| 19 | France | iron | ann | 248 | 10020 |
| 20 | France | iron | michael | 719 | 10739 |
| 21 | US | wood | mike | 867 | 11606 |
| 22 | US | wood | james | 729 | 12335 |
| 23 | US | plastic | james | 18 | 12353 |
| 24 | US | plastic | mike | 394 | 12747 |

| Position | Country | material | user | units summed up (aggregated Units) |
|---|---|---|---|---|
| 0 | | | | 0 |
| 1 | Germany | wood | michael | 381 |
| 2 | Germany | wood | michael | 1052 |
| 3 | Germany | wood | michael | 1871 |
| 4 | Germany | wood | michael | 2139 |
| 5 | Germany | wood | michael | 3110 |
| 6 | Germany | wood | mike | 3678 |
| 7 | Germany | wood | mike | 4422 |
| 8 | Germany | wood | james | 4498 |
| 9 | Germany | wood | michael | 5063 |
| 10 | Germany | iron | mike | 5392 |
| 11 | Germany | iron | james | 6109 |
| 12 | Germany | iron | armin | 6676 |
| 13 | Germany | plastic | ann | 7445 |
| 14 | France | wood | michael | 8420 |
| 15 | France | wood | james | 8516 |
| 16 | France | wood | mike | 9184 |
| 17 | France | wood | mike | 9427 |
| 18 | France | iron | ann | 9772 |
| 19 | France | iron | michael | 10020 |
| 20 | France | iron | mike | 10739 |
| 21 | US | wood | james | 11606 |
| 22 | US | wood | james | 12335 |
| 23 | US | plastic | mike | 12353 |
| 24 | US | plastic | | 12747 |

| | Country | material | user | | | |
|---|---|---|---|---|---|---|
| 6 | Germany | wood | michael | 568 | 3678 | |
| 7 | Germany | wood | mike | 744 | 4422 | |
| Sum | | | | 744 = | 4422 − | 3678 |
| | | | | 1 | 2 | |

Processed rows

FIG. 3B

| | Country | material | user | | | |
|---|---|---|---|---|---|---|
| 3 | Germany | wood | michael | 819 | 1871 | |
| 4 | Germany | wood | michael | 268 | 2139 | |
| 5 | Germany | wood | michael | 971 | 3110 | |
| 6 | Germany | wood | michael | 568 | 3678 | |
| Sum | | | | 1807 = | 3678 − | 1871 |
| | | | | 3 | 2 | |

Processed rows

FIG. 3C

| Position | Country | material | user | units | units summed up |
|---|---|---|---|---|---|
| 0 | 0 | 0 | 0 | 0 | 0 |
| 1 | Germany | wood | michael | 381 | 381 |
| 2 | Germany | wood | michael | 671 | 1052 |
| 3 | Germany | wood | michael | 819 | 1871 |
| 4 | Germany | wood | michael | 268 | 2139 |
| 5 | Germany | wood | michael | 971 | 3110 |
| 6 | Germany | wood | michael | 568 | 3678 |
| 7 | Germany | wood | mike | 744 | 4422 |
| 8 | Germany | wood | mike | 76 | 4498 |
| 9 | Germany | wood | james | 565 | 5063 |
| 10 | Germany | iron | michael | 329 | 5392 |
| 11 | Germany | iron | mike | 717 | 6109 |
| 12 | Germany | iron | james | 567 | 6676 |
| 13 | Germany | plastic | armin | 769 | 7445 |
| 14 | France | wood | ann | 975 | 8420 |
| 15 | France | wood | michael | 96 | 8516 |
| 16 | France | wood | james | 668 | 9184 |
| 17 | France | wood | mike | 243 | 9427 |
| 18 | France | iron | mike | 345 | 9772 |
| 19 | France | iron | ann | 248 | 10020 |
| 20 | France | iron | michael | 719 | 10739 |
| 21 | US | wood | mike | 867 | 11606 |
| 22 | US | wood | james | 729 | 12335 |
| 23 | US | plastic | james | 18 | 12353 |
| 24 | US | plastic | mike | 394 | 12747 |
| Sum | | | | 12747 | = 12747 − 0 |
| Processed rows | | | | 24 | 2 |

| Position | Country | material | user | units | units summed up | | | | | |
|---|---|---|---|---|---|---|---|---|---|---|
| 0 | 0 | 0 | 0 | 0 | 0 | | | | | |
| 1 | Germany | wood | michael | 381 | 381 | | | | | |
| 2 | Germany | wood | michael | 671 | 1052 | | | | | |
| 3 | Germany | wood | michael | 819 | 1871 | | | | | |
| 4 | Germany | wood | michael | 268 | 2139 | | | | | |
| 5 | Germany | wood | michael | 971 | 3110 | | | | | |
| 6 | Germany | wood | michael | 568 | 3678 | | | | | |
| 7 | Germany | wood | mike | 744 | 4422 | | | | | |
| 8 | Germany | wood | mike | 76 | 4498 | | | | | |
| 9 | Germany | wood | james | 565 | 5063 | | | | | |
| 10 | Germany | iron | michael | 329 | 5392 | | | | | |
| 11 | Germany | iron | mike | 717 | 6109 | | | | | |
| 12 | Germany | iron | james | 567 | 6676 | | | | | |
| 13 | Germany | plastic | armin | 769 | 7445 | | | | | |
| 14 | France | wood | ann | 975 | 8420 | | | | | |
| 15 | France | wood | michael | 96 | 8516 | | | | | |
| 16 | France | wood | james | 668 | 9184 | | | | | |
| 17 | France | wood | mike | 243 | 9427 | | | | | |
| 18 | France | iron | mike | 345 | 9772 | | | | | |
| 19 | France | iron | ann | 248 | 10020 | | | | | |
| 20 | France | iron | michael | 719 | 10739 | | | | | |
| 21 | US | wood | mike | 867 | 11606 | | | | | |
| 22 | US | wood | james | 729 | 12335 | | | | | |
| 23 | US | plastic | james | 18 | 12353 | | | | | |
| 24 | US | plastic | mike | 394 | 12747 | | | | | |
| Sum | | | | 8641 | 8641 = | 12335 | - | 10739 | + | 9427 | - | 7445 | + | 5063 | - | 0 |
| Processed rows | | | | 15 | 6 | | | | | |

FAST AGGREGATION ON COMPRESSED DATA

BACKGROUND

Databases commonly organize data in the form of tables, where each table has a number of rows and columns. Each row in the table generally has a data value associated with each of the columns, where this intersection of a row and a column is commonly referred to as a cell. A system needing access to data in the database typically issues a request in the form of a query. The query usually involves a request for the data contained in one or more cells of any rows which meet a particular condition. This condition often involves the comparison of the values of cells in a column to some other value to determine whether the row associated with the compared cell meets the condition.

Aggregation queries can be used to aggregate data in some rows of the database based on some criteria. These queries can aggregate millions or billions of rows of data in a database. Aggregating millions or billions of rows of data can be a major cost.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for improving aggregation performance by creating and using a column and/or row of aggregated data.

Figure 1:
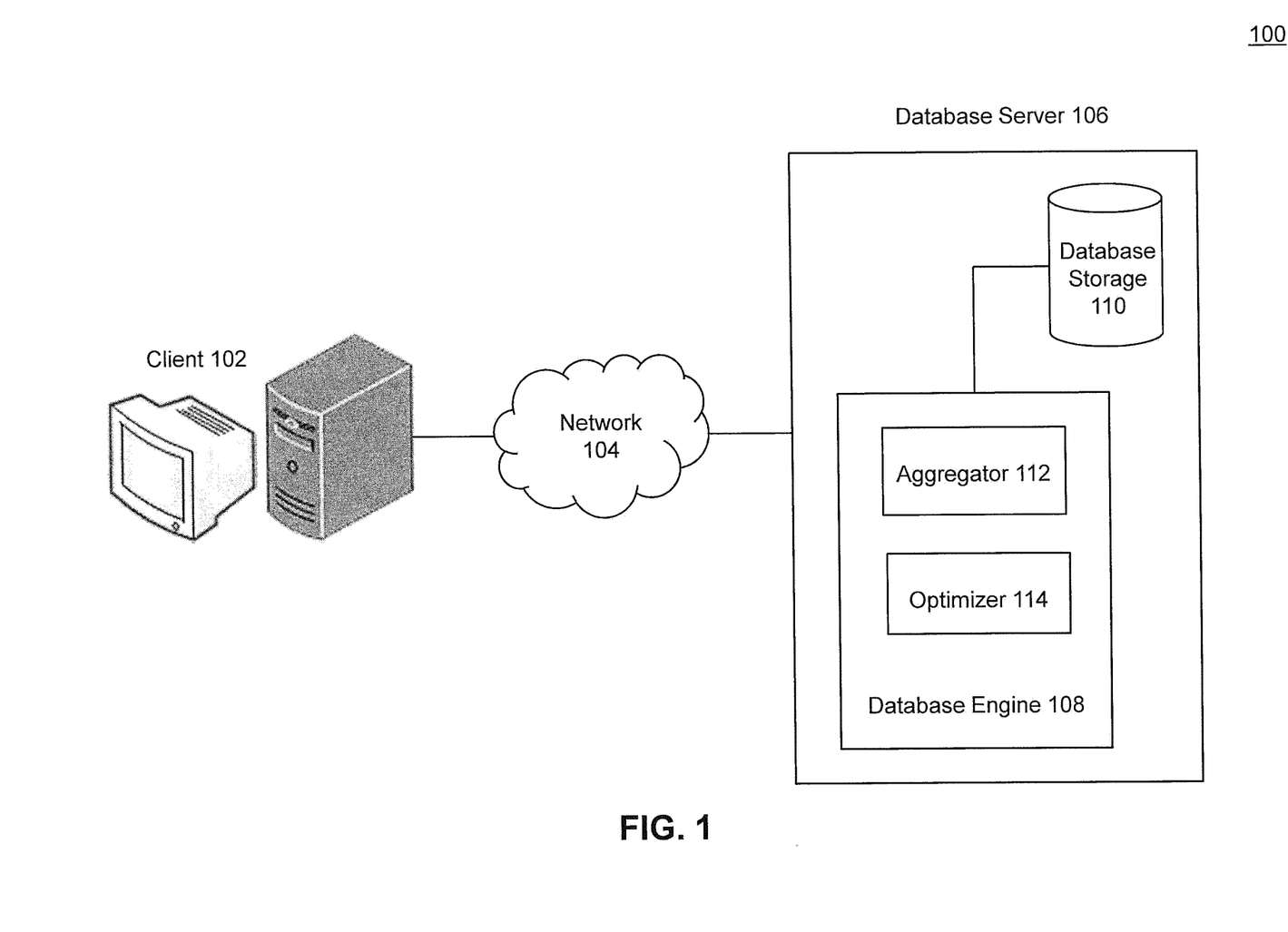
FIG. 1 is a block diagram of a database network, according to some embodiments.

FIG. 1 depicts a database network 100, according to some embodiments. The database network 100 can include a client system 102, a network 104, and a database server 106. The database server 106 can include a database engine 108 and database storage 110.

Client system 102 can be operable to send a request for data, commonly in the form of a database query, to database server 106 over network 104. Database server 106 can reply to the request by sending a set of results, for example, in the form of result rows from a database table, to client system 102 over network 104. One skilled in the relevant arts will appreciate that any data format operable to convey a request for data and a reply to the request may be used. In accordance with an embodiment, the requests and replies can be consistent with the conventions used in the Structured Query Language ("SQL"), although this example is provided solely for purposes of illustration and not limitation.

Network 104 can optionally be either a public or private communications network. In accordance with an embodiment, network 104 can be the Internet. In accordance with an additional embodiment, network 104 can be a private intranet, such as a corporate network. Network 104 can be any other form of wired or wireless network.

When a request for data, such as a query, is received by database server 106, it can be handled by database engine 108, in accordance with an embodiment. Database engine 108 can be operable to determine the data requested by the query, obtain the data, and provide a reply to the query. One skilled in the relevant arts will appreciate that while database engine 108 is illustrated as a single module in database network 100, database engine 108 may be implemented in a number of ways in order to accomplish the same function, including separating each of the aforementioned operations performed by database engine 108 into individual modules. Accordingly, the illustration of modules in database server 106 is not a limitation on the implementation of database server 106.

Database engine 108 can be operable to obtain the data in response to the query from database storage 110, in accordance with an embodiment. Database storage 110 can store values of a database in a data structure. In accordance with an embodiment, database values can be stored in a table data structure, the table having data rows and columns. At the intersection of each row and column is a data cell, the data cell having access to a data value corresponding to the associated row and column. Each column, in accordance with an embodiment, has an associated data type, such as "string" or "integer," which can be used by database engine 108 and client system 102 to interpret data contained in a data cell corresponding to the column. In accordance with an embodiment, the database storage 110 can comprise multiple tables. In an embodiment, database engine 108 can further include aggregator 112 and optimizer 114. The operation of aggregator 112 and optimizer 114 is described further below.

Additionally, database storage 110 can comprise alternate means of indexing data (e.g., bitmap) stored in a table of a database, in accordance with an embodiment. Database engine 108 can be operable to analyze a query to determine whether an available alternate means is useful to optimally access the data stored in a table, and then depending on the result of the analysis utilizes this alternate means to obtain data from the table, in accordance with an embodiment.

Figure 2A:
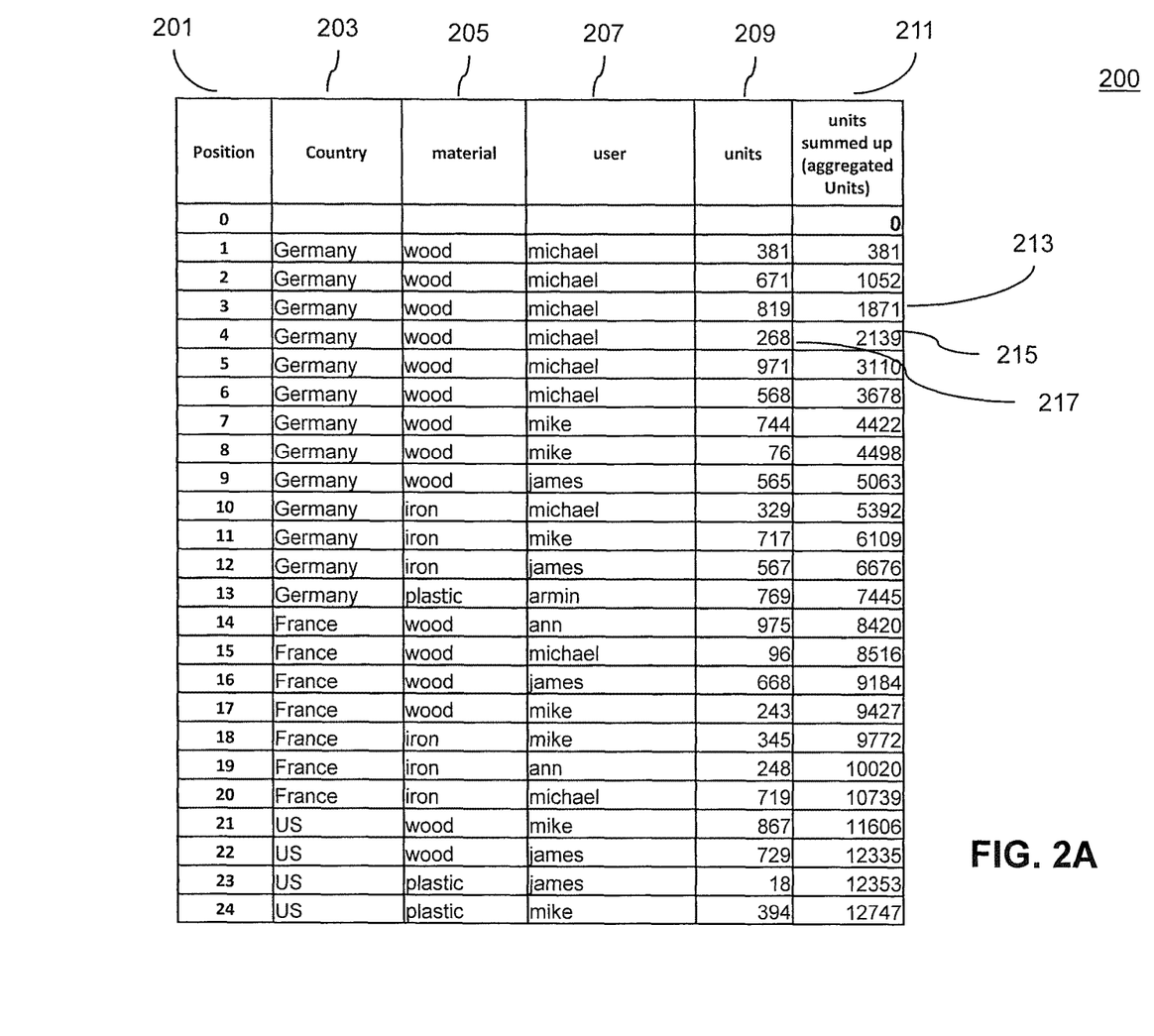
FIGS. 2A and 2B are data structures, according to some embodiments.

According to one embodiment, database engine 108 can include optimizer 114. optimizer 114 can be configured to reorder and/or reorganize the rows of data of a table data structure of a database to, for example, optimize the memory size and/or performance. In one example, optimizer 114 can reorder a table data structure of the database to build blocks of data to store the information with block-description. In this example, the blocks can correspond with a major query type. For example, FIG. 2A is an exemplary table data structure 200 that is stored in database storage 110. In this example, table data structure 200 is ordered based on country, material, and user. For example, optimizer 114 can be configured to reorder a table to be stored as table 200. In this example, column 201 of table 200 illustrates the position of a row in the table (e.g., row number). Column 203 illustrates the country. Column 205 illustrates the material. Column 207 illustrates the user's name. Column 209 illustrates the units. And column 211 illustrates the aggregated units (units summed up) as described in more detail below.

It is noted that table data structure 200 of FIG. 2A and any tables or data structures discussed throughout this application are given for example purposes only and are not meant to be limiting and one skilled in the relevant arts will appreciate that any data format, any table, and/or any reordering may be used. In the example of FIG. 2A, optimizer 114 has organized table 200 in blocks that correspond to major query types. For example, a major query can request for "units" per "country=US". In another example, a major query can request for "units" per "material" and "country". In other words, optimizer 114 can organize a table data structure into areas and blocks that data is usually aggregated over.

According to one embodiment, table data structure 200 also includes the aggregated units (units summed up) column 211. The data in each row of aggregated units column 211 is the sum of the data in the row above it in aggregated units column 211 and the data in units column 209 of the same row. For example, the value 2139 in cell 215 is the sum of 1871 in cell 213 and 268 in cell 217. In this embodiment, aggregator 112 is configured to generate aggregated units column 211 when table 200 is being generated. In other words, when database server 106 receives new data that is to be stored in table 200, aggregator 112 is configured to generate the cell in aggregated units column 211 based on the new data and the data already stored in table 200. For example, if table 200 only includes rows at positions 1-3, when the new data for the row at position 4 is to be stored by database server 106, aggregator 112 would receive the new data (country=Germany; material=wood; user=Michael; units=268), aggregator 112 would retrieve and/or read the last cell in the aggregated units column 211 (aggregated unit=1871), and aggregator 112 would add the new unit value (268) and the retrieved aggregated value (1871) and would store it in cell 215 of aggregated units column 112.

Additionally or alternatively, aggregator 112 and optimizer 114 can operate together to generate aggregated units column 211 when a table is being reordered to generate table 200. Although database engine 108 is shown to include optimizer 114, it is noted that this disclosure is not limited to having optimizer 114 for reordering or reorganizing a table. In other words, the embodiments of this disclosure can operate on a table that has already been ordered. For example, the embodiments of this disclosure are configured to operate on column-stores.

Also, it is noted that although the embodiments of this disclosure are discussed with respect to an aggregated value column (such as units summed up column 211 of FIGS. 2A and 2B), the aggregated values can be stored in any other structure in which the original data has been stored.

Figure 2B:
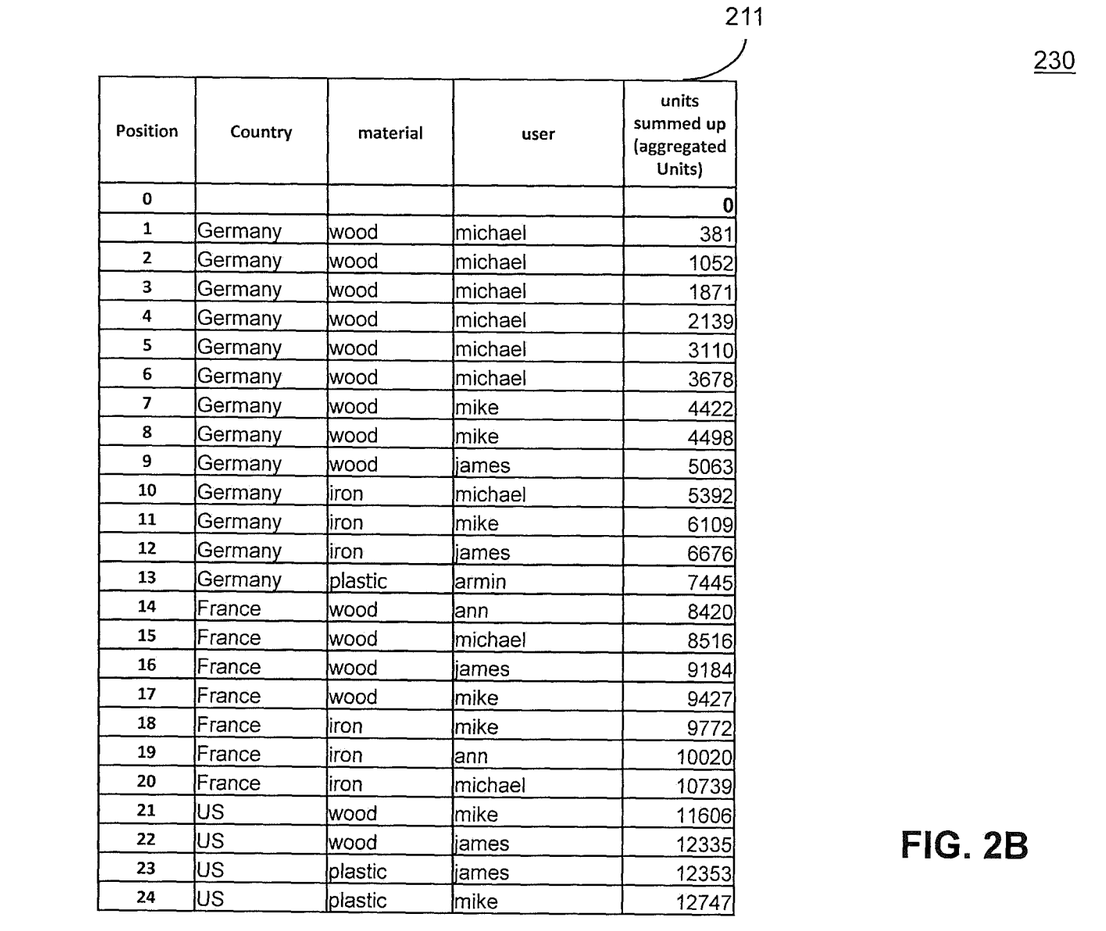

Further, it is noted that although table 200 of FIG. 2A is illustrated to include the units column 209, units column 209 is optional and table 200 can be generated without the units column 209. FIG. 2B illustrates table data structure 230. Table data structure 230 of FIG. 2B is similar to table data structure 200 of FIG. 2A with the difference that table 230 does not include the units column 209 of FIG. 2A. Therefore, according to some embodiments of this disclosure, database network 100 includes a data structure that comprises cells storing aggregated data. The aggregated data in each cell is calculated based on aggregated data in a cell before it in the aggregated column (or row depending on how the data structure is stored) and the data associated with the row (or column) in which the aggregated cell is.

In addition to generating the aggregated units column 211 of table 200, aggregator 112 is configured to determine a sum value for a block data in a table stored by the database server 106. FIGS. 3A-3D illustrate additional exemplary functions performed by aggregator 112, according to some embodiments.

Figure 3A:
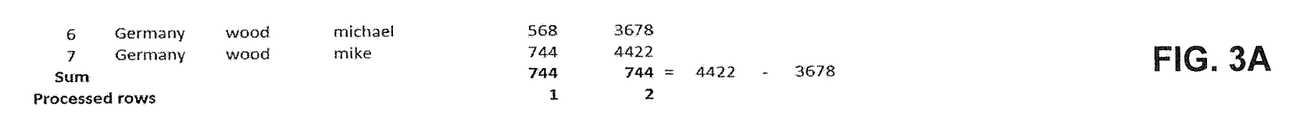
FIGS. 3A-3D are exemplary operations, according to some embodiments.

In FIG. 3A, database engine 108 receives a query to determine the value of units for row 7. According to this example, since table data structure 200 (or table data structure 230) stores the aggregated units in column 211, in order to determine the value of units for row 7, database engine 108, and more specifically, for example, aggregator 112 is configured to read the values of aggregated units for rows 7 and 7-1. The aggregator 112 further calculates the difference between the read values of aggregated units for row 7 and 7-1. The aggregator unit 112 then returns this value as the requested value of units for row 7.

Figure 3B:
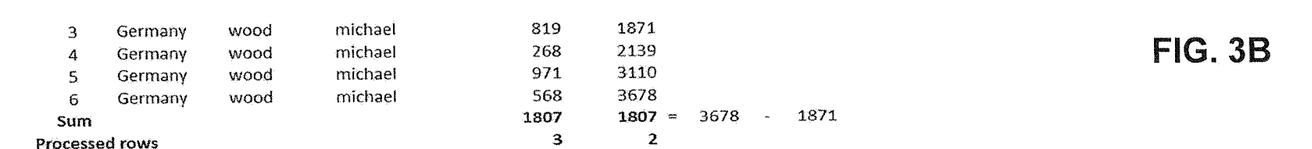

In FIG. 3B, database engine 108 receives a query to determine the sum of the value of units for the block of rows 4-6. According to this example, since table data structure 200 (or table data structure 230) stores the aggregated units in column 211, in order to determine the sum of value of units for the block of rows 4-6, database engine 108, and more specifically for example aggregator 112 is configured to read the values of aggregated units for row 6 and row 4-1. The aggregator unit 112 further calculates the difference between the read values of aggregated units for row 6 and 4-1. The aggregator 112 then returns this value as the requested value of the sum of units for the block of rows 4-6. In this example, aggregator 112 performs two read operations in determining the sum of the value of units for the block of rows 4-6. In a conventional system, database engine 108 has to perform three read operations (read rows 4, 5, and 6) in order to determine the sum of the value of units for the block of rows 4-6. It is noted that usual sum queries can aggregate millions or billions of rows of data that can be of major cost. By using the system and methods of the embodiments of this disclosure these costs can be reduced. In other words, the embodiments of this disclosure reduce the number of memory reads, which would reduce access time for similar queries. This would increase the efficiency, response time, and speed of the database server 106. Additionally, the embodiments of this disclosure reduces memory traffic for the database server 106.

Figure 3C:
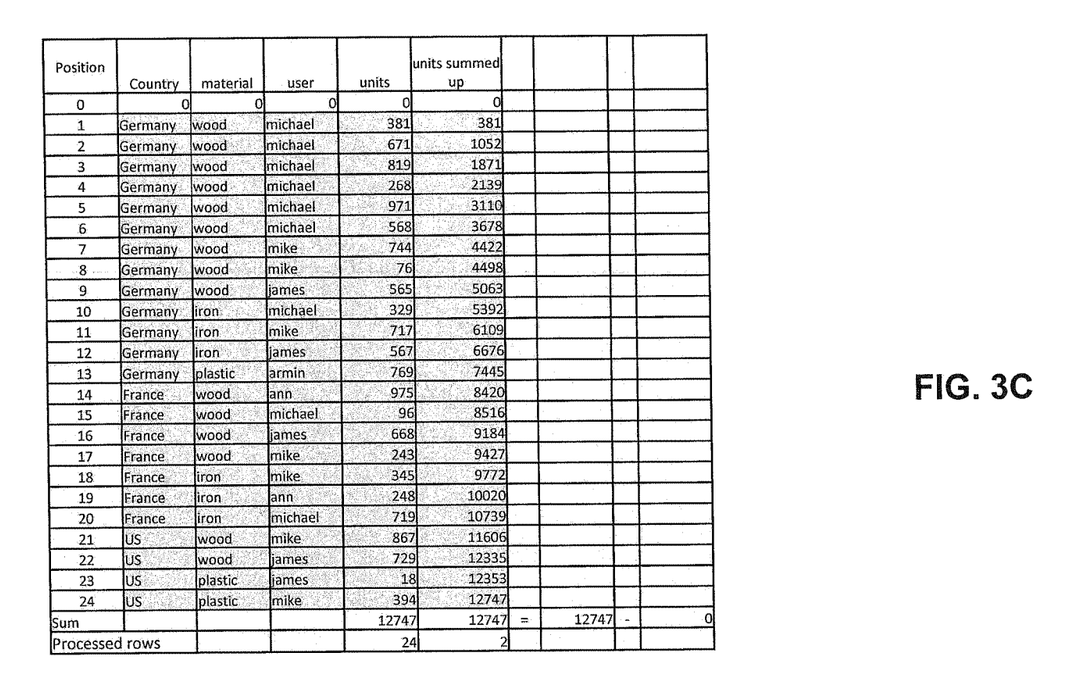

In FIG. 3C, database engine 108 receives a query to determine the sum of the value of units for block 1-24 (the block of rows 1-24). According to this example, since table data structure 200 (or table data structure 230) stores the aggregated units in column 211, in order to determine the sum of value of units for block 1-24, database engine 108, and more specifically, for example, aggregator 112 is configured to read the values of aggregated units for row 24 and row 1-1. The aggregator unit 112 further calculates the difference between the read values of aggregated units for row 24 and row 1-1. The aggregator 112 then returns this value as the requested value of the sum of units for block 1-24. In this example, aggregator 112 performs two read operation in determining the sum of the value of units for block 1-24. In a conventional system, database engine 108 has two perform twenty four read operations (read rows 1-24) in order to determine the sum of the value of units for block 1-24. In this special example, since the block for which the aggregated value is to be determined starts at 1 and the value of aggregated units for row 0 (1-1) is 0, the operation can only include one read operation. This is because the value of aggregated units for 0 is 0.

Figure 3D:
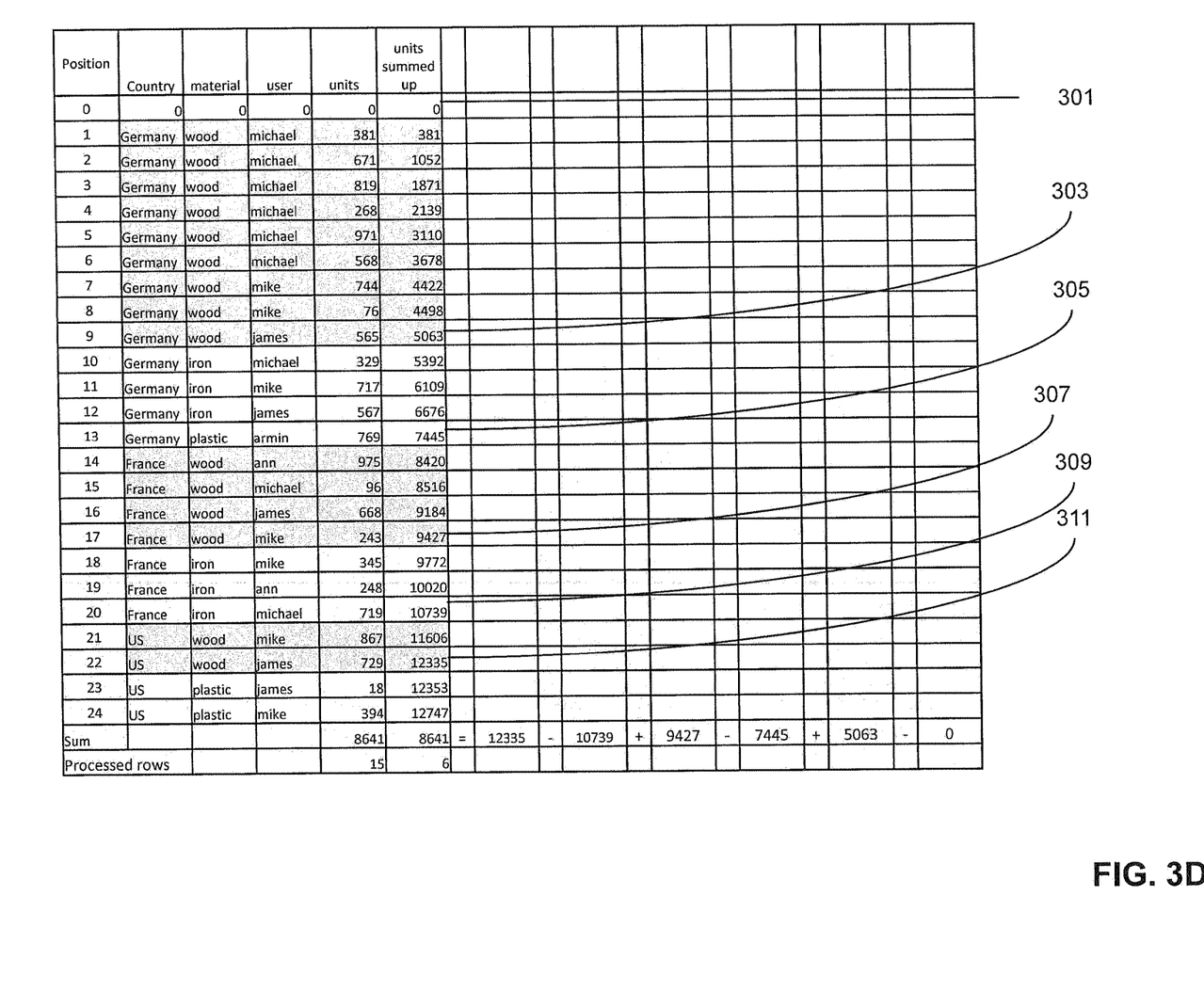

In FIG. 3D, database engine 108 receives a query to determine the sum of the value of units for blocks where "material=wood". As shown in FIG. 3D, these blocks include rows 1-9, 14-17, and 21-22. According to this example, since table data structure 200 (or table data structure 230) stores the aggregated units in column 211, in order to determine the sum of value of units for blocks where "material=wood", database engine 108, and more specifically, for example, aggregator 112 is configured to read the values of aggregated units for row 0, row 9, row 13, row 17, row 20, and row 22. The aggregator unit 112 further calculates the difference between the read values of aggregated units for rows 9 and 0; rows 17 and 13; and rows 22 and 20. The aggregator 112 then adds these differences and then returns this value as the requested value of the sum of units for blocks where "material=wood". In this example, aggregator 112 performs six read operation in determining the sum of the value of units for blocks where "material=wood". In a conventional system, database engine 108 has to perform fifteen read operations (read rows 1-9, 14-17, and 21-22) in order to determine the sum of the value of units for block where "material=wood". Therefore, the number of read operations depends on the number of blocks not the number of rows. In the example of FIG. 3D, aggregator 112 operates on three blocks of data, where each block has three read operations.

Figure 4:
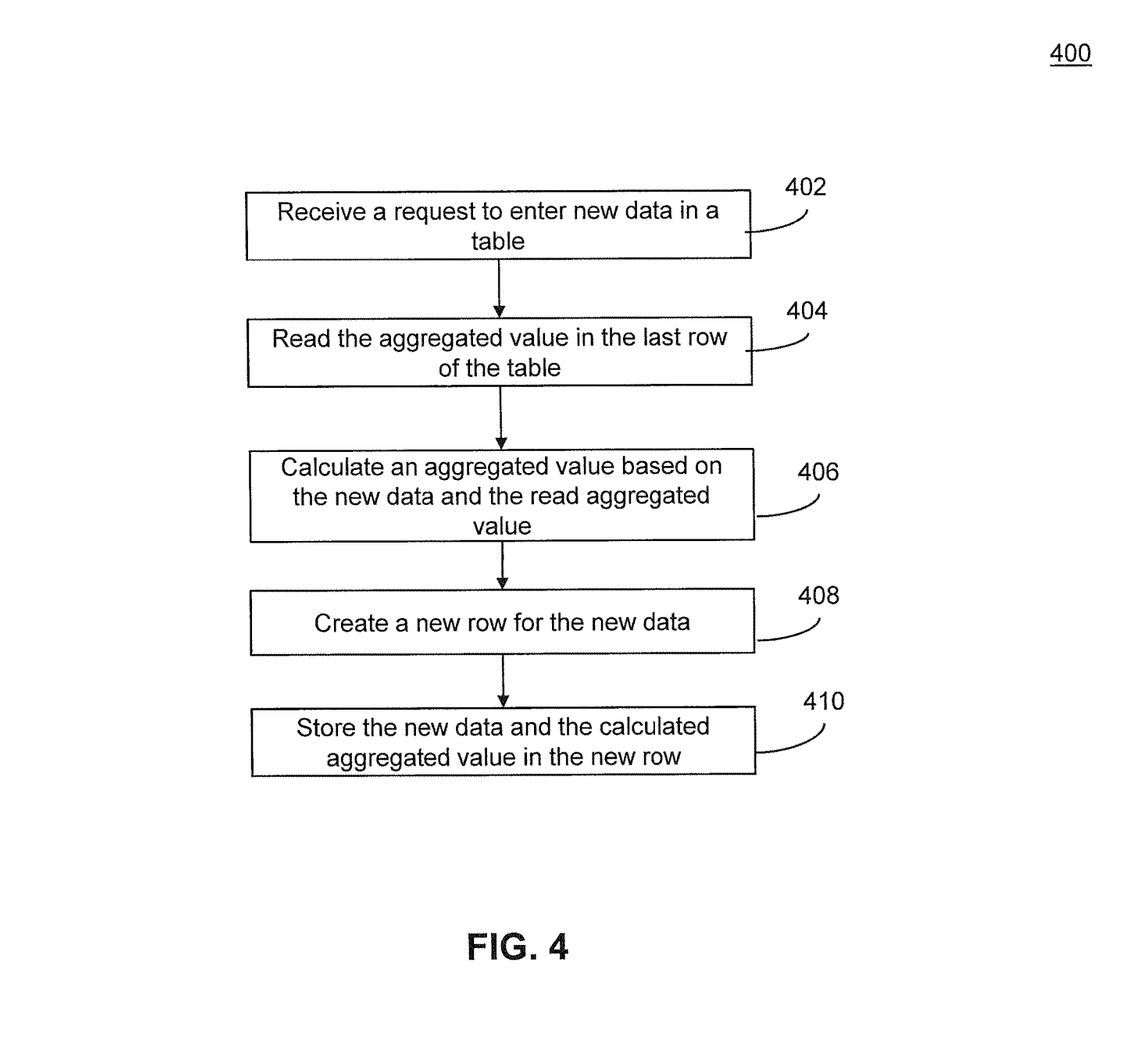
FIG. 4 is a flowchart illustrating a process generating a data structure, according to some embodiments.

FIG. 4 is a flowchart for a method 400, according to an embodiment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1, 2A, and 2B. However, method 400 is not limited to that example embodiment.

In 402, database engine 108, and more specifically, for example, aggregator 112 receives a request to enter new data in a table data structure. For example, aggregator 112 receives new data from a user to enter into table data structure 200 of FIG. 2A or 230 of FIG. 2B. As described above, this table data structure includes a column that represents aggregated data. For example, tables 200 and 230 include the aggregated units column 211 that represents aggregated data. The request to enter data can include a request to enter data in a block of the table data structure.

In 404, database engine 108, and more specifically, for example, aggregator 112 reads the aggregated data (aggregated value) in the last row of the table. Additionally or alternatively, the read aggregated value can represents a sum over values associated with data that is stored in the block in the table data structure. In 406, database engine 108, and more specifically, for example, aggregator 112 uses the new data and the read aggregated data to calculate the new aggregated data (aggregated value) for the new row of data.

In 408, database engine 108, and more specifically, for example, aggregator 112 creates the new row for the new data in the table data structure. In 410, database engine 108, and more specifically, for example, aggregator 112 stores the new data and the calculated aggregated data in the newly created row. In one example, the calculated aggregated data can represent the sum over the values associated with the data that is stored in the block in the table data structure.

As a non-limiting example, method 400 of FIG. 4 is described with table data structure 230 of FIG. 2B, assuming that row 23 is the last row of the table and data in row 24 is the new data to be added in table 230. In this example, aggregator 112 can receive a request to enter new data in row 24. The new data to be entered includes "country=US", "material=plastic", "user=mike", and "units=394". When aggregator 112 receives this request, aggregator 112 reads the aggregated data (aggregated value) in the last row of table 230. In this example, the aggregated data of last row is the aggregated units cell of row 23 that has a value of 12353 units. Aggregator 112 creates row 24. Aggregator 112 adds the read aggregated data (12353 units) and the corresponding data of the new data to be entered (394 units) to calculate the new aggregated data (12747 units). Aggregator 112 stores the new data with the new aggregated data (12747 units) in row 24 of table 230. In one example, aggregator 112 does not store the value of the units and only stores the aggregated data (along with other data,) as shown in table 230 of FIG. 2B. Alternatively, aggregator 112 can store the value of the units with the aggregated data (along with other data,) as shown in table 200 of FIG. 2A.

As another non-limiting example, method 400 of FIG. 4 is described with table data structure 230 of FIG. 2B, assuming that row 19 is the last row of the block of table with block description "country=France" and data in row 20 is the new data to be added in table 230. In this example, aggregator 112 can receive a request to enter new data in the block of table data structure 230 with block description that "country=France". In this example, this block of table data structure includes rows 14-19. The new data to be entered includes "country=France", "material=iron", "user=Michael", and "units=719". When aggregator 112 receives this request, aggregator 112 determines, from the request, the block of the table data structure in which the new data is to be stored. Aggregator 112 reads the aggregated data (aggregated value) in the last row of this block of table 230, which represents the sum of the values for this block and the block before it. In this example, the aggregated data of last row of this block is the aggregated units cell of row 19 that has a value of 10020 units. Aggregator 112 creates row 20 in this block. Aggregator 112 adds the read aggregated data (10020 units) and the corresponding data of the new data to be entered (719 units) to calculate the new aggregated data (10739 units). Aggregator 112 stores the new data with the new aggregated data (10739 units) in row 20 of table 230. The new aggregated data represent the new sum of the values (units) for this block and any blocks before it. In some embodiments, aggregator 112 can update any other rows (for example, rows 21-24) that are after the row added.

In addition to or alternative to the embodiment of method 4, aggregator 112 can receive a request to enter new data in a table data structure and determine where in the table the new data should be stored. In this example, after receiving the new data and examining it, aggregator 112, alone or in combination with optimizer 114, can determine a row in the table data structure after which the new data is to be stored. This determination can occur, for example, based on the value of each cell in the new data, the way in which the table is ordered, and/or the value of each cell in the table. After determining the row in the table after which the new data is to be stored, aggregator 112 reads the aggregated data (aggregated value) in the determined row. Next, aggregator 112 uses the new data and the read aggregated data to calculate a new aggregated data (aggregated value) for the new row of data. Aggregator 112 can create the new row for the new data in the table after the determined row and can store the new data and the calculated aggregated data in the newly created row. In this example, aggregator 112 can further update the aggregated data of any row that are after the newly created row.

Figure 5:
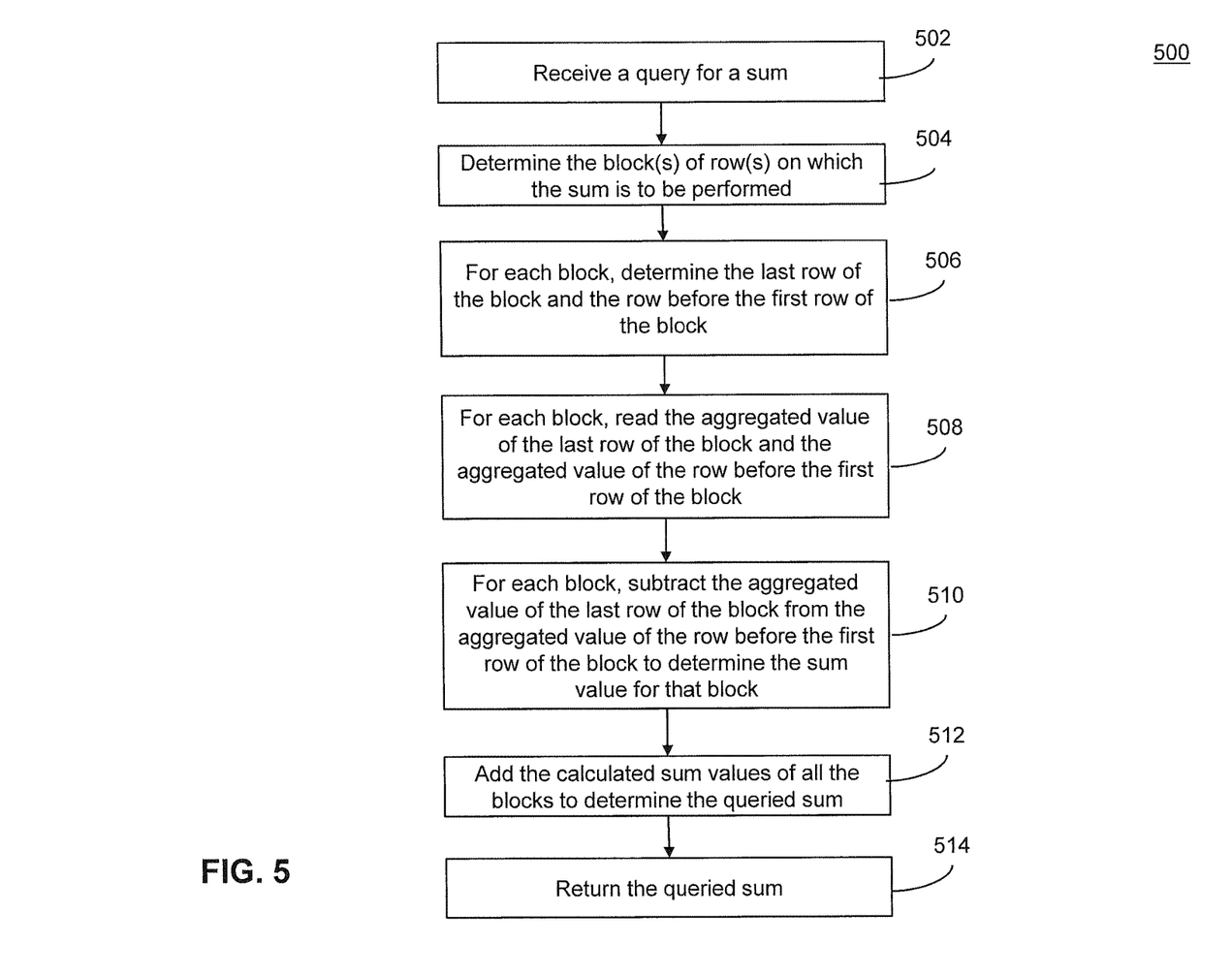
FIG. 5 is a flowchart illustrating a process for responding to an aggregation query, according to some embodiments.

FIG. 5 is a flowchart for a method 500 for responding to an aggregation query, according to an embodiment. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIGS. 1, 2A, 2B, and 3A-3D. However, method 500 is not limited to that example embodiment.

In 502, database engine 108, and more specifically, for example, aggregator 112 receives a query to calculate a summation on a block of data. As a non-limiting example, and with reference to FIG. 3D, aggregator 112 receives a query to determine the sum of the value of units for a block where "material=wood". In 504, aggregator 112 determines the block(s) of row(s) on which the sum is to be performed. For example, as shown in FIG. 3D, these blocks includes rows 1-9, 14-17, and 21-22. In this example, aggregator 112 can determine three blocks of rows 1-9, rows 14-17, and rows 21-22 on which to perform the summation.

In 506, aggregator 112 determines, for each block, the last row of the block and also the row before the first row of that block. For example, as shown in FIG. 3D, aggregator 112 determines that the last row of the first block is row 9 and the row before the first row of the first block is row 0. For the second block, aggregator 112 determines that the last row is 17 and the row before the first row of this block is 13. And for the third block, aggregator 112 determines that the last row is 22 and the row before the first row of this block is 20.

In 508, for each block, aggregator 112 reads the aggregated value of the last row of the block (that is stored in the aggregated cell of that row) and the aggregated value of the row before the first row of the block. For example, as illustrated in FIG. 3D, table data structures 200 or 230 store the aggregated units in column 211. In order to determine the sum of value of units for blocks where "material=wood", aggregator 112 reads the values of aggregated units (units summed up) associated with rows 0, 9, 13, 17, 20, and 22. In other words, aggregator 112 reads the values of cells 301, 303, 305, 307, 309, and 311, respectively.

In 510, for each block, aggregator 112 subtracts the aggregated value associated with the last row of the block from the aggregated value associated with the row before the first row of the block to determine the sum value for that block. For example, with reference to FIG. 3D, aggregator unit 112 calculates the difference between the read values of aggregated units associated with row 9 and 0; 17 and 13; and 22 and 20.

In 512, aggregator 112 adds the calculated sum values of all the blocks to determine the queried sum. For example, with reference to FIG. 3D, aggregator 112 adds the difference between the read values of aggregated units associated with row 9 and 0; 17 and 13; and 22 and 20. In 514, aggregator 112 returns this value as the requested value of the sum. In example of FIG. 3D, the request value is the sum of units for blocks where "material=wood".

Although example method 500 of FIG. 500 is discussed with respect to an aggregation (sum) query, it is noted that similar method can be applied when the query is to read the data of one row. In this example, aggregator 112 reads the aggregated data (stored in the aggregated cell of the table data structure) associated with the queried row. Aggregator 112 also reads the aggregated data (stored in the aggregated cell of the table data structure) associated with the row before the queried row, and calculated the difference between the two read aggregated data. This exemplary embodiment was discussed above with respect to FIG. 3A.

Figure 6:
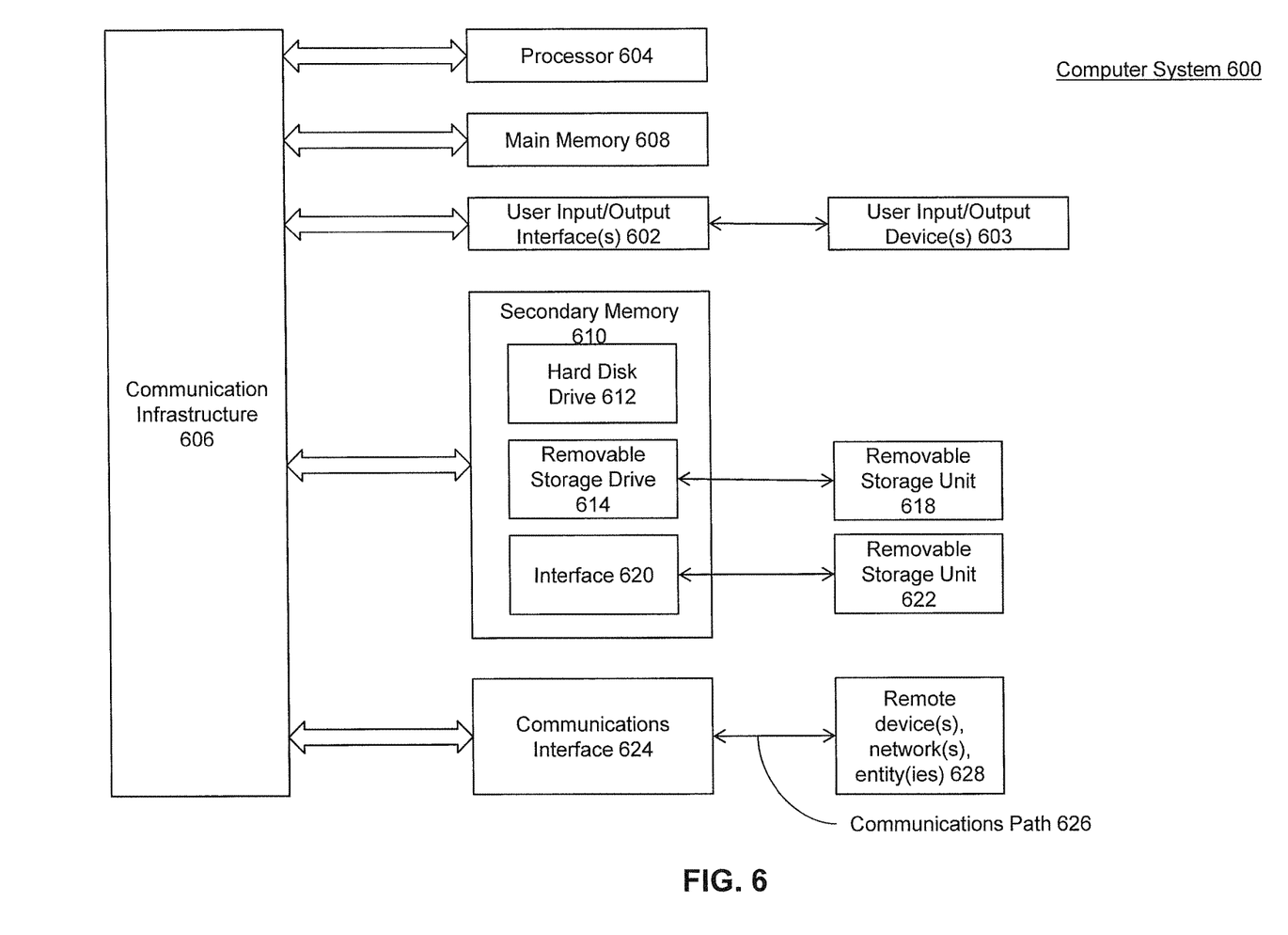
FIG. 6 is an example computer system useful for implementing various embodiments.

Various embodiments can be implemented, for example, using one or more computer systems, such as computer system 600 shown in FIG. 6. Computer system 600 can be used, for example, to implement method 400 of FIG. 4 and/or method 500 of FIG. 5. For example, computer system 600 can generate table data structures such as table data structure 200 of FIG. 2A and/or table data structure 230 of FIG. 2B that include an aggregated data column, according to some embodiments. Computer system 600 can further calculate a sum over block(s) of data in the generated table data structure, according to some embodiments. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer implemented method, comprising:
   ordering, by at least one processor, a table into a plurality of blocks;
   receiving, by the at least one processor, a request to calculate a sum value;
   determining, by the at least one processor and using a parameter associated with the request, a first plurality of blocks, wherein the first plurality of blocks comprise a first block of data in the table and a second block of data, wherein the first block of data in the table comprises a first plurality of rows associated with the parameter, and wherein the second block of data in the table comprises a second plurality of rows associated with the parameter;
   reading, by the at least one processor, a first aggregated value stored in a row before a first row of the first block;
   reading, by the at least one processor, a second aggregated value stored in a last row of the first plurality of rows of the first block;
   subtracting, by the at least one processor, the second aggregated value from the first aggregated value to generate a first sum value associated with the first block;
   reading, by the at least one processor, a third aggregated value stored in a row before a first row of the second block;
   reading, by the at least one processor, a fourth aggregated value stored in a last row of the second plurality of rows of the second block;
   subtracting, by the at least one processor, the fourth aggregated value from the third aggregated value to generate a second sum value associated with the second block; and
   adding, by the at least one processor, the first sum value associated with the first block and the second sum value associated with the second block to generate the sum value associated with the first and second blocks.

2. The method of claim 1, further comprising:
   receiving, by the at least one processor, a second request to enter data in the table;
   determining, by the at least one processor and using a second parameter associated with the second request, a third block in the plurality of blocks for entering the data, wherein the third block comprises a plurality of rows associated with the second parameter;
   reading, by the at least one processor, a fifth aggregated value stored in one of the plurality of rows of the third block in the table, wherein the fifth aggregated value represents a sum over at least values associated with data that is stored in the plurality of rows of the third block in the table;

calculating, by the at least one processor, a sixth aggregated value by adding the fifth aggregated value and a value associated with the data to be entered in the table; and storing, by the at least one processor, and in addition to the fifth aggregated value, at least part of the data to be entered and the sixth aggregated value in the third block in the table, wherein, after the storing, the sixth aggregated value represents the sum over the at least values associated with the data that is stored in the third block in the table.

3. The method of claim 2, further comprising:

creating, by the at least one processor, a new row in the third block of the table, wherein the new row is added to the plurality of rows of the third block; and storing, by the at least one processor, the sixth aggregated value in the new row of the third block of the table.

4. The method of claim 3, wherein the reading the fifth aggregated value further comprises:

reading, by the at least one processor, the fifth aggregated value from a cell of a last row of the plurality of rows of the third block of the table.

5. The method of claim 4, wherein the third block comprises a plurality of columns and one of the plurality of the columns stores the fifth and sixth aggregated values.

6. The method of claim 1, further comprising:

before reading the first and second aggregated values, determining, by the at least one processor, the last row of the first block and the row of before the first row of the first block.

7. The method of claim 1, further comprising:

returning, by the at least one processor, the first sum value associated with the first block.

8. The method of claim 1, further comprising:

returning, by the at least one processor, the sum value associated with the first and second blocks.

9. A system, comprising:

a memory; and at least one processor coupled to the memory and configured to:

order a table into a plurality of blocks;

receive a request to calculate a sum value;

determine, using a parameter associated with the request, a first plurality of blocks, wherein the first plurality of blocks comprise a first block of data in the table and a second block of data, wherein the first block of data in the table comprises a first plurality of rows associated with the parameter, and wherein the second block of data in the table comprises a second plurality of rows associated with the parameter;

read a first aggregated value stored in a row of a second block before a first row of the first block;

read a second aggregated value stored in a last row of the first plurality of rows of first the block;

subtract the second aggregated value from the first aggregated value to generate a first sum value associated with the first block;

read a third aggregated value stored in a row before a first row of the second block;

read a fourth aggregated value stored in a last row of the second plurality of rows of the second block;

subtract the fourth aggregated value from the third aggregated value to generate a second sum value associated with the second block; and add the first sum value associated with the first block and the second sum value associated with the second block to generate the sum value associated with the first and second blocks.

10. The system of claim 9, the at least one processor further configured to:

receive a second request to enter data in the table;

determine, using a second parameter associated with the second request, a third block in the plurality of blocks for entering the data, wherein the third block comprises a plurality of rows associated with the second parameter;

read a fifth aggregated value stored in one of the plurality of rows of the third block in the table, wherein the fifth aggregated value represents a sum over at least values associated with data that is stored in the plurality of rows of the third block in the table;

calculate a sixth aggregated value by adding the fifth aggregated value and a value associated with the data to be entered in the table; and store, in addition to the fifth aggregated value, at least part of the data to be entered and the sixth aggregated value in the third block in the table, wherein, after the storing, the sixth aggregated value represents the sum over the at least values associated with the data that is stored in the third block in the table.

11. The system of claim 10, the at least one processor is further configured to:

create a new row in the third block of the table, wherein the new row is added to the plurality of rows of the third block; and store the sixth aggregated value in the new row of the third block of the table.

12. The system of claim 11, wherein to read fifth aggregated value the at least one processor is configured to:

read the fifth aggregated value from a cell of a last row of the plurality of rows of the third block of the table.

13. The system of claim 12, wherein the third block comprises a plurality of columns and one of the plurality of the columns stores the fifth and sixth aggregated values.

14. The system of claim 9, the at least one processor further configured to:

before reading the first and second aggregated values, determine the last row of the first block and the row before the first row of the first block.

15. The system of claim 9, the at least one processor further configured to:

return the sum value associated with the first and second blocks.

* * * * *